Feb. 22, 1938. G. SLAYTER 2,109,258
SEALING APPARATUS
Original Filed March 30, 1933 4 Sheets-Sheet 1
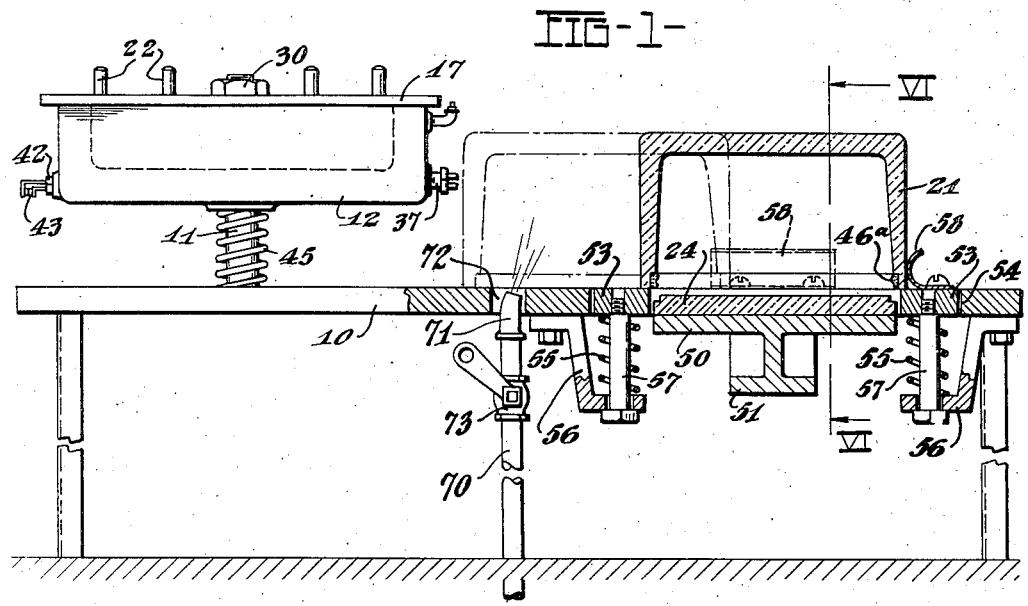
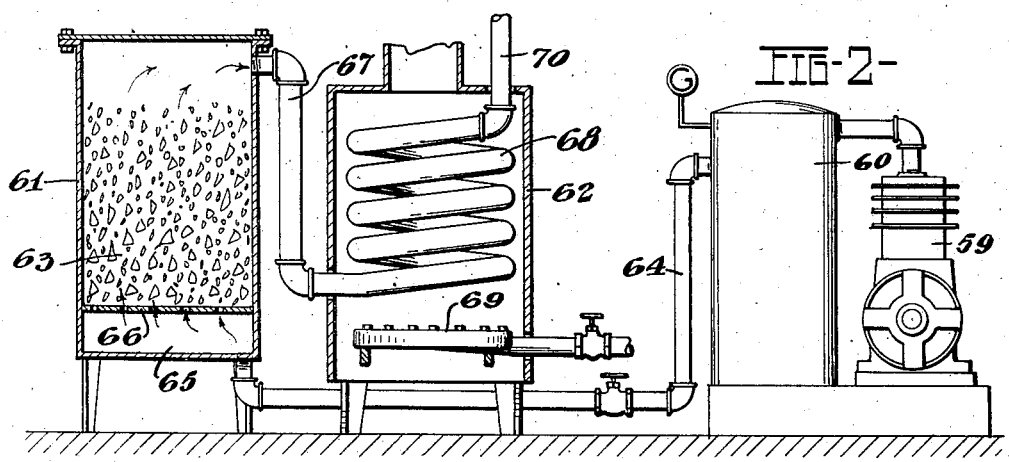
Inventor
James Slayter
By J. F. Rule
Attorney

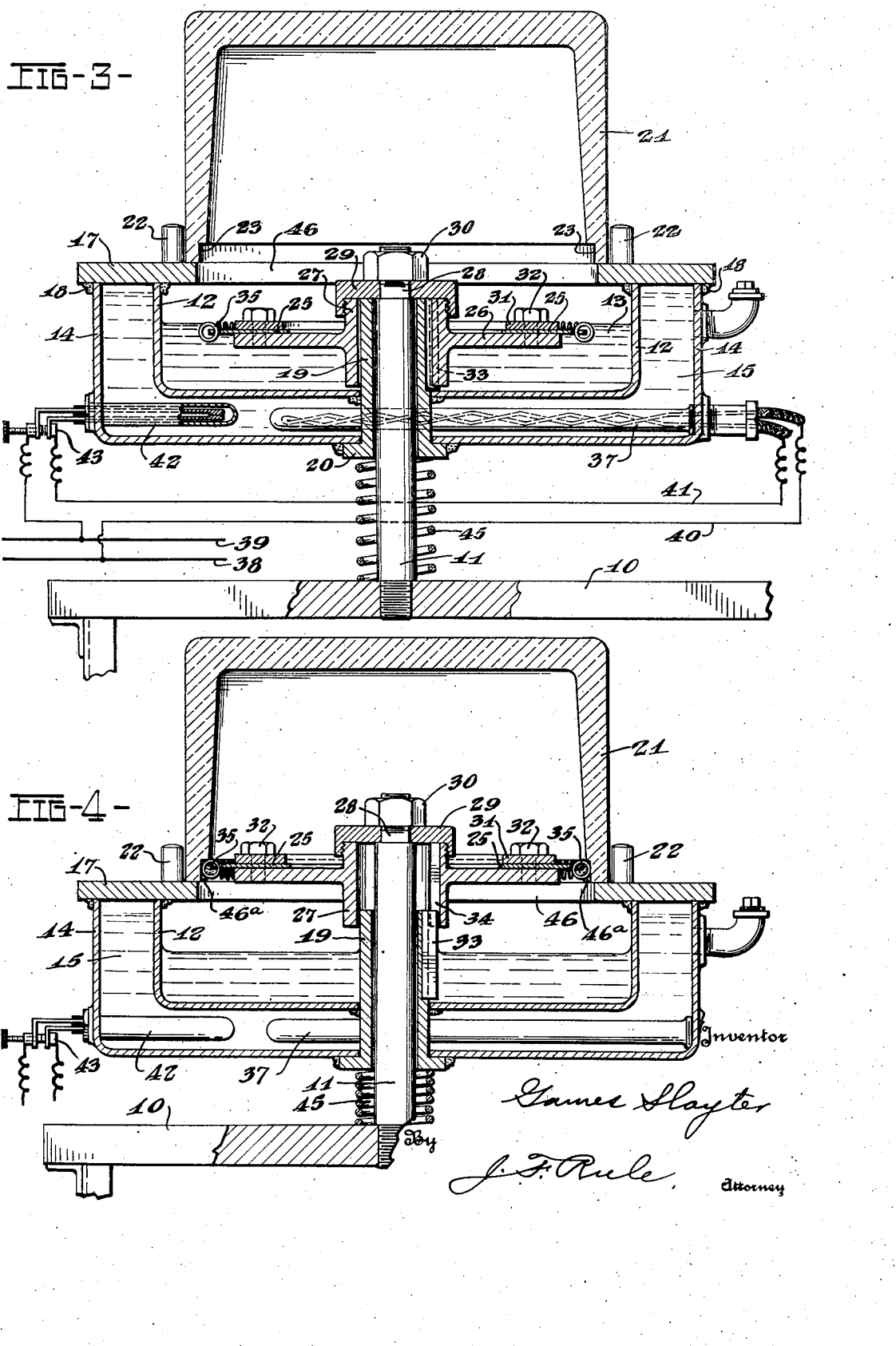

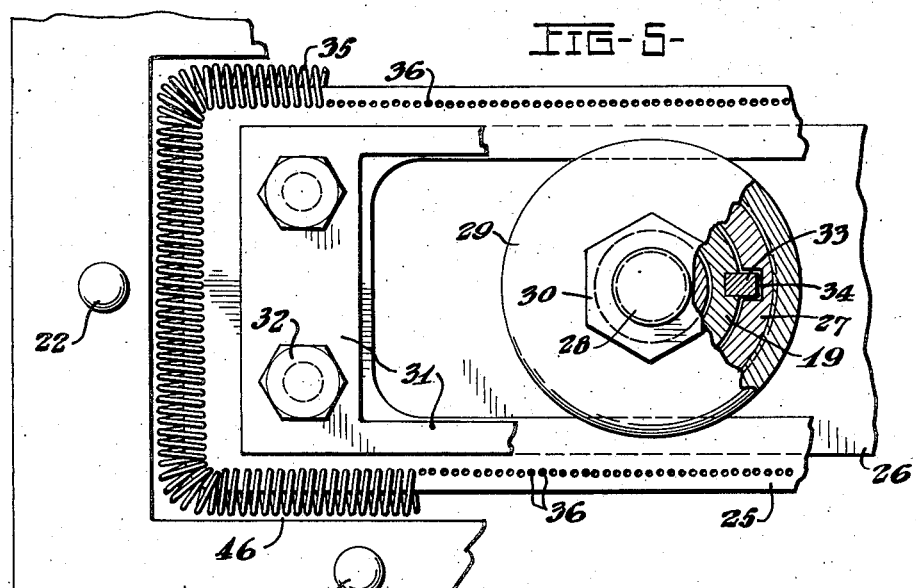
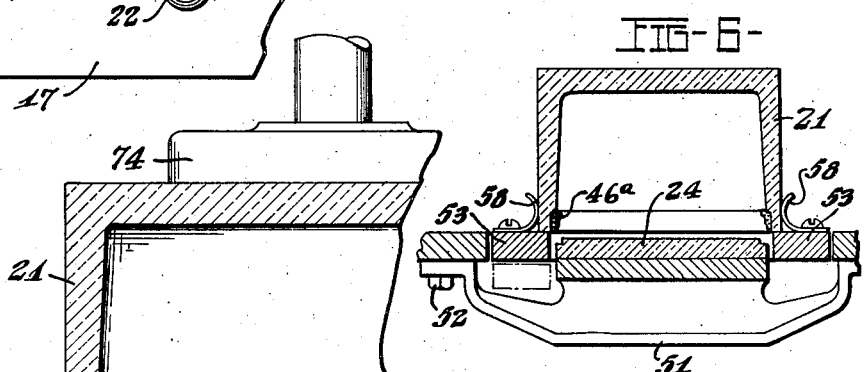
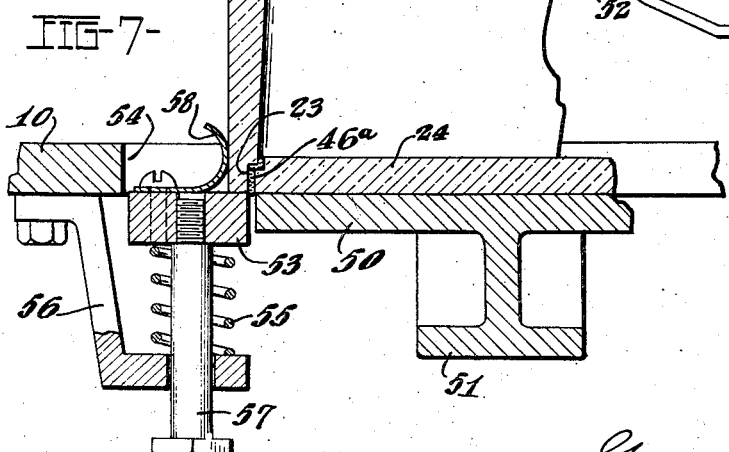

Feb. 22, 1938. G. SLAYTER 2,109,258
SEALING APPARATUS
Original Filed March 30, 1933 4 Sheets-Sheet 4
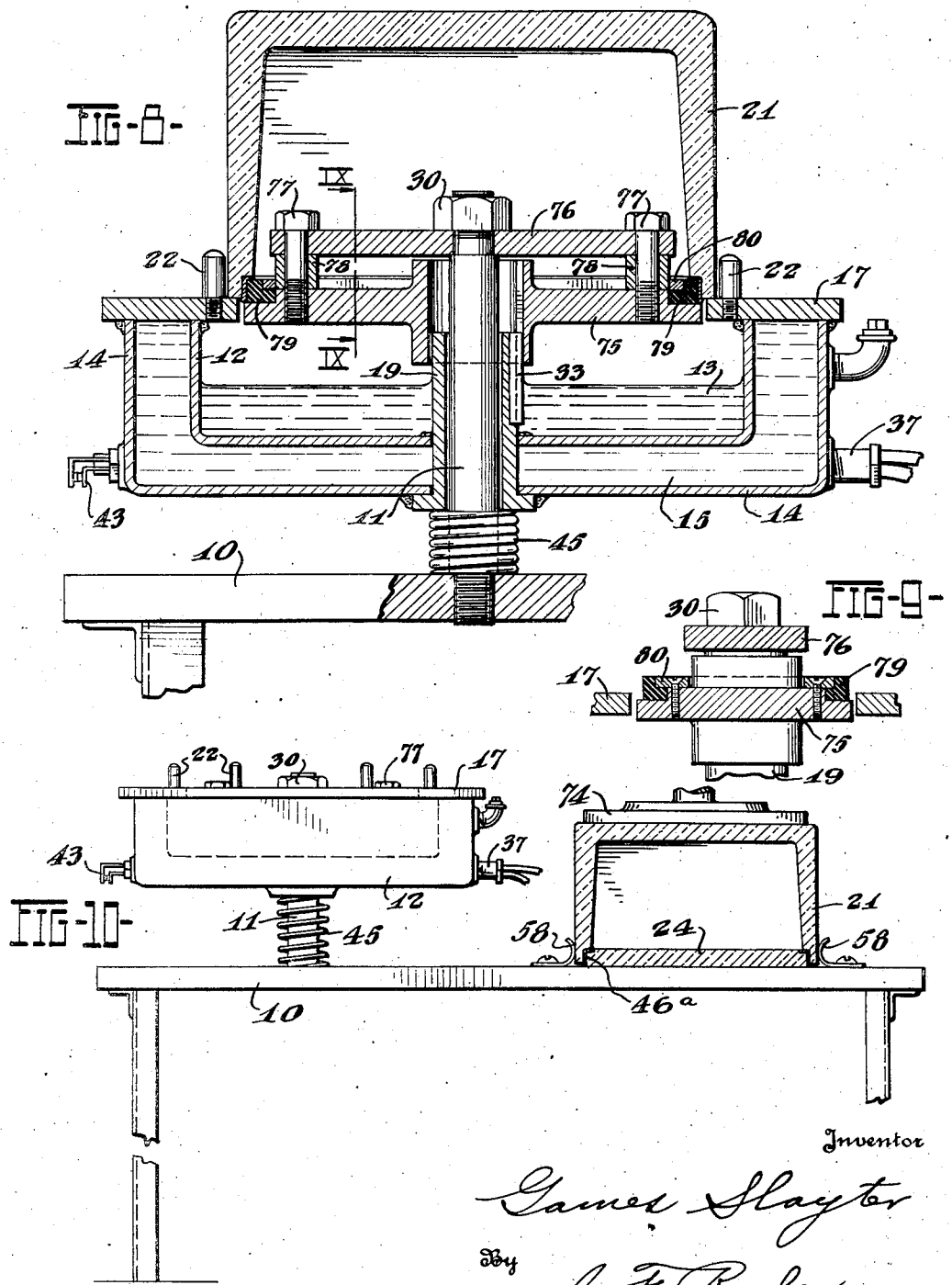
Inventor
James Slayter
By J. F. Rule, Attorney Patented Feb. 22, 1938

2,109,258

UNITED STATES PATENT OFFICE 2,109,258

SEALING APPARATUS

Games Slayter, Newark, Ohio, assignor to Owens-Illinois Glass Company, a corporation of Ohio Application March 30, 1933, Serial No. 663,667
Renewed November 9, 1936

5 Claims. (Cl. 226—82)

My invention relates to apparatus adapted for attaching parts together with an adhesive applied in a liquid or semifluid state to the surfaces which are to be united. In the form of the invention herein illustrated, the apparatus is adapted for use in sealing a glass cover plate or lid in the open side of a hollow glass block to provide a hermetically sealed hollow block.

An object of the invention is to provide a simple and practical sealing mechanism by which the sealing operation may be quickly performed with facility, neatness, accuracy and reliability, and without waste of the sealing material. More particularly, the invention provides an apparatus including means for maintaining a bath of the sealing material at a suitable temperature for application to the hollow block or article, means for applying to the edge of the article which is to be sealed, a uniform layer or coating of the sealing material, means for supplying hot, dry air to the interior of the article before sealing, and means to facilitate the uniting of the hollow article and cover plate after the sealing material has been applied.

Other objects of the invention will appear hereinafter.

Referring to the accompanying drawings, which illustrate apparatus constructed in accordance with the principles of my invention:

Fig. 1 is a part sectional elevation of the apparatus.

Fig. 2 is a part sectional elevation of the air drying and heating mechanism.

Fig. 3 is a sectional elevation showing an apparatus for applying the sealing compound, and a hollow block positioned thereon.

Fig. 4 is a view similar to Fig. 3, but with the platform and hollow block thereon depressed for applying the sealing material.

Fig. 5 is a fragmentary top plan view, partly in section, of mechanism shown in Figs. 3 and 4.

Fig. 6 is a sectional elevation at the line VI—VI on Fig. 1, showing apparatus used in uniting the hollow block and cover plate.

Fig. 7 is a fragmentary sectional view of such apparatus with the hollow block moved downward into sealing engagement with the cover plate.

Fig. 8 is a view similar to Fig. 4, showing a modified construction.

Fig. 9 is a section at the line IX—IX on Fig. 8.

Fig. 10 is a view similar to Fig. 1, showing a modification of the means for supporting the hollow block and cover plate during the sealing operation.

Referring to the drawings, and as shown in Fig. 1, the mechanism for applying the sealing material to the hollow articles is mounted on a table 10 and includes a tank or container 12 for the bath of sealing liquid. To the right of the tank 12 is apparatus for use in uniting the hollow block and its cover plate after a coat of the sealing material has been applied.

The mechanism for applying the sealing compound to the hollow blocks will first be described. Referring to Figs. 3 and 4, a vertical post 11 fixed to the table, provides a support and guide for the tank 12 in which is a bath 13 of the sealing liquid. The tank is movable up and down on the post, as more fully set forth hereinafter. The tank is jacketed with an outer case 14 spaced therefrom to provide a chamber 15 enveloping the bottom and side walls of the tank. Within the chamber 15 is a heating medium such as glycerin or other liquid which is maintained at a constant temperature sufficiently high to keep the bath of sealing compound 13 in a liquid or semifluid condition and at the proper temperature for the sealing operations. A platform 17 is mounted on the tank 12 and provides a cover for the chamber 15. Sealing material 18 makes a tight connection between the platform 17 and the parts 12 and 14.

The tank 12 with the platform 17 thereon, is guided in its up and down movements by a hollow shaft or sleeve 19 fixed to the tank and mounted to slide up and down on the post 11. Said sleeve extends through openings in the bottoms of the tank 12 and the jacket 14 and is formed with a flange 20 at its lower end engaging beneath the case 14, thereby supporting the tank and parts carried therewith.

A hollow block 21, to which a cover plate is to be sealed, is placed in an inverted position on the platform 17 and held against lateral displacement by means of guide posts 22 mounted on the platform. The block 21 may be formed, as shown, with a recess extending along its inner marginal surface to provide a sealing surface 23, said recess being adapted to receive the cover plate 24 (see Fig. 7).

The means for transferring a coating of the sealing material from the bath 13 to the surface 23 includes a stationary transfer plate 25 which, as shown, is made of comparatively thin sheet metal and is mounted on a supporting plate 26. The latter is formed with a hub or sleeve 27 which surrounds the sleeve 19. The post 11 is formed at its upper end with an extension 28 of reduced diameter which extends through an opening in a cap 29 threaded onto the upper end of the hub 27. A locking nut 30 clamps the cap 29 in position on the post 11. Overlying the transfer plate 25 is a clamping frame 31. Screw bolts 32 clamp the frame 31 and plates 25 and 26 together. A key 33 (Figs. 4 and 5) secured to the sleeve 19 is slidable vertically in a groove 34 formed in the hub 27, thereby preventing rotation of the container 12 and connected parts during their up and down movement. Extending along the outer margin of the transfer plate 25 is a coil spring 35 (Fig. 5) threaded through a series of perforations 36 formed in the plate. The coil spring provides an applicator for transferring the sealing compound from the bath and applying it to the sealing surface 23 of the hollow block.

The tank 12 containing the bath of sealing material is normally held in its elevated position by means of a coil spring 45 so that the transfer plate with its applicator 35 is immersed in the sealing material. When downward pressure is applied to the block 21, the block and tank are lowered so that the transfer plate 25 enters the block, bringing the applicator 35 into contact with the surface 23 and thereby applying a coating of the sealing material to said surface. The platform 17 is formed with an opening 46 to permit the passage of the transfer plate therethrough.

The bath 13 of sealing material is heated to the required temperature by a heating element 37 mounted within the heating chamber 15. The heating element may consist of a standard immersion heater which includes a heating coil within a metal casing, but insulated therefrom. The coil is heated by an electric current supplied from the mains 38 and 39. One terminal of the coil is connected through a conductor 40 to the main 38. The other terminal is connected through a conductor 41 to one terminal of a thermostat 42 mounted in the casing 14 and immersed in the heating liquid, the other terminal of the thermostat being connected to the main 39. The thermostat includes an automatic switch 43 which operates in a well known manner to maintain the heating liquid 13 at a substantially constant temperature. That is, if the temperature falls below a predetermined degree, the switch is automatically closed so that the heating element 37 receives current and raises the temperature, causing the switch 43 to open when the desired temperature is reached. The sealing bath 13 is thus maintained at the desired temperature.

The sealing compound when intended for use in sealing glass blocks, as herein set forth, may consist of a mixture of 90% rosin and 10% castor oil. This provides a transparent cement which is sufficiently liquid at a moderately high temperature, for example, 150° to 160° F. to be easily applied and at the same time possesses sufficient body to insure a complete seal. Moreover, such a cement quickly cools and hardens sufficiently to provide a permanent and reliable seal.

While the hollow block and cover plate are being secured together, the latter is supported on a stationary platform 50 which is formed with an integral bracket 51 for attachment to the table 10 as by means of bolts 52 (Fig. 6). The supporting surface of the platform 50 is substantially co-extensive laterally with the cover plate 24 which is supported thereon, the platform being preferably somewhat lower than the table so that the plate 24 is supported with its upper face on a level with or just below the surface of the table 10. Surrounding the platform 50 is a supporting frame or platform 53 which provides a support for the hollow block 21. The table 10 is provided with an opening 54 to receive the frame 53 which is normally held at about the level of the table. Coil springs 55 are interposed between the platform 53 and brackets 56 secured to the lower surface of the table. The springs hold the platform normally in its uppermost position but permit it to move downward under pressure. The springs 55 are mounted on posts 57 attached to and extending downward from the platform 53. The heads of said posts provide stops to limit the upward movement of the platform. Spring clips or stops 58 are mounted on the platform 53 in position to engage the sides and one end of the block 21 when the latter is placed on the platform 53 and thus hold the block centered over the platform 50 and the plate 24 thereon.

Means for supplying hot, dry air to the interior of the block 21 prior to the sealing operation, comprises the apparatus shown in Fig. 2. This includes an air compressor 59 which may be of conventional construction, a storage tank 60 for the compressed air, a drier including a drum 61, and a heater 62. The drier drum 61 contains a suitable drying material 63 such as calcium chloride which serves to extract the moisture from the air passing therethrough. The air under pressure is conducted from the tank 60 through a pipe 64 and enters a compartment 65 in the bottom of the drum 61, and passes upward through a perforated false bottom or screen 66 into the compartment containing the drying material 63. The dry air passes from the drier through a pipe 67 to a heating coil 68. A gas burner 69 maintains the coil 68 at a high temperature, so that the air passing through the coil is heated to a high degree. The hot air is conducted from the coil through a pipe 70 to a nozzle 71 which extends upward into or through an opening 72 in the table 10, said opening being preferably located adjacent the platform 53. A valve 73 in the pipe 70 serves as a throttle valve to regulate the flow of hot air and may also be used for shutting off the flow of air.

The operation may be described as follows: A hollow block 21 is placed open side down on the platform 17 and held against lateral displacement by the guide pins 22 attached to the platform. Downward pressure is then applied to the block, thereby lowering it, together with the tank, to the Fig. 4 position, compressing the spring 45. The bath 13 of sealing compound is thus lowered away from the transfer plate 25, leaving a coating of the compound on the plate and the coil spring or applicator 35. By the downward movement of the hollow block 21, the applicator 35 is brought into the marginal recess of the block and thereby applies a coating or film 46ª of the sealing material to the surfaces of said recess. The pressure is now removed from the block 21, permitting the tank and parts carried thereby to be lifted by the spring 45 back to the Fig. 3 position.

The block 21 is then lifted from the platform 17 and placed on the table 10 over the nozzle 71 so that the hot, dry air flowing from the nozzle quickly fills the block and also warms the block to a certain extent. The block is now slid to the right, to the full line position (Fig. 1) in which it is supported on the platform 53, the spring clips 58 serving to arrest and hold the block centered on the platform.

Downward pressure is now applied to the block 21, thereby lowering the platform and block and bringing the block into sealing engagement with the lid or cover plate 24 which has been placed on the platform 50. This downward pressure may be effected either by hand or by means of a power operated press head 74 which is brought down on the block and applies the required pressure to complete the sealing operation.

The sealing material 46ª has sufficient body and is sufficiently viscous to insure a perfect seal between the block and the lid 24. The sealing material quickly cools when brought in contact with the comparatively cold lid 24 and is thus hardened sufficiently to provide a permanent seal. The hot air within the block also quickly cools with a consequent reduction of pressure, thereby causing a partial vacuum within the block. At the same time the temperature of the block itself is lowered, causing a moderate contraction which applies pressure to the sealing medium and thus tends to increase the effectiveness and permanency of the seal.

In the modification shown in Fig. 8, the sealing material is transferred from the bath to the hollow block by means of a transfer plate 75 having a fixed mounting on the post 11. The means for attaching the plate 75 to the post comprises an auxiliary plate or yoke 76 mounted on the upper reduced end of the post 11 and connected to the plate 75 by bolts 77. Collars 78 are mounted on the bolts 77 between the plates 76 and 75 for spacing said plates apart. The plate 75 carries an applicator 79 in the form of a marginal strip of felt wool or other suitable material for transferring a coat of the sealing material from the bath 13 to the sealing surface of the hollow block. A metal binding strip 80 (Fig. 9) serves to secure the applicator 79 in position on the plate 75. When the tank 12 is in its normal elevated position, the transfer plate 75 and the applicator 79 thereon are immersed in the sealing liquid 13.

In Fig. 10, I have shown a modification of the means for supporting the hollow block and cover plate during the sealing process. In this instance, the cover plate is supported directly on the table 10. The yieldable platform for the hollow block is also omitted, the block being placed directly on the cover plate, the spring clips 58 serving to guide and hold the block in position.

Modifications may be resorted to within the spirit and scope of my invention.

What I claim is:

1. The combination of a table, a stationary support for a cover plate or lid, a platform surrounding said support, and springs holding the platform at about the level of the table and permitting downward movement of the platform under pressure, the platform being adapted to hold a hollow article, open side downward, over a cover plate on said stationary support and permitting said article and platform to be moved downward under pressure into sealing engagement with the cover plate.

2. The combination of a table having an opening therein, a stationary supporting plate, an open platform mounted in said opening in the table and surrounding said plate, said platform being movable downward relative to the table, and spring means for normally holding the platform at about the level of said table.

3. The combination of a table having an opening therein, a stationary supporting plate, an open platform mounted in said opening in the table and surrounding said plate, said platform being movable downward relative to the table, spring means for normally holding the platform at about the level of said table, and spring clips mounted on said platform in position to hold a hollow article in alignment with said stationary support.

4. Apparatus for sealing a cover plate to the open side of a hollow article, comprising a table on which the article is supported with its open side downward, means for supporting the cover plate with its upper face at no time higher than the plane of the table, means for directing a gas into said article while supported in said position on the table adjacent the cover plate, the parts being arranged to permit the article to be moved laterally to a position directly over the cover plate while the table and cover plate maintain the article substantially closed, and means by which relative movement of said article and cover plate may be effected to bring said plate into sealing engagement with the article.

5. In apparatus for sealing a cover plate to a hollow article, the combination of a table having an opening therein, means for supporting the cover plate within said opening with the upper surface of said plate at no time higher than the level of the table, means for directing a heated gas upwardly into the hollow article while the latter is supported on the table with its open side downward, said article being movable laterally from said gas receiving position to a position directly over the cover plate, and means for directing the cover plate into sealing engagement with said article.

GAMES SLAYTER.